US012067973B2

(12) United States Patent
Noonan

(10) Patent No.: US 12,067,973 B2
(45) Date of Patent: *Aug. 20, 2024

(54) METHODS, SYSTEMS AND APPARATUSES FOR PROVIDING A HUMAN-MACHINE INTERFACE AND ASSISTANT FOR FINANCIAL TRADING

(71) Applicant: Rialto Trading Technology, LLC, New York, NY (US)

(72) Inventor: Shari Noonan, New York, NY (US)

(73) Assignee: RIALTO TRADING TECHNOLOGY, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,825

(22) Filed: Aug. 15, 2022

(65) Prior Publication Data

US 2022/0406297 A1 Dec. 22, 2022

Related U.S. Application Data

(63) Continuation of application No. 16/827,593, filed on Mar. 23, 2020, now Pat. No. 11,417,332, which is a
(Continued)

(51) Int. Cl.
| | | |
|---|---|---|
| *G10L 15/06* | (2013.01) | |
| *G06F 3/16* | (2006.01) | |
| *G06F 16/2452* | (2019.01) | |
| *G06F 16/248* | (2019.01) | |
| *G06N 20/00* | (2019.01) | |

(Continued)

(52) U.S. Cl.
CPC ............ *G10L 15/063* (2013.01); *G06F 3/167* (2013.01); *G06F 16/24522* (2019.01); *G06F 16/248* (2019.01); *G06N 20/00* (2019.01); *G06Q 40/04* (2013.01); *G10L 15/08* (2013.01); *G10L 15/22* (2013.01); *G10L 15/30* (2013.01); *G10L 2015/223* (2013.01)

(58) Field of Classification Search
CPC .................................................. G06Q 30/0203
See application file for complete search history.

(56) References Cited

U.S. PATENT DOCUMENTS

| | | |
|---|---|---|
| 5,845,266 A | 12/1998 | Lupien et al. |
| 6,012,046 A | 1/2000 | Lupien et al. |

(Continued)

FOREIGN PATENT DOCUMENTS

| | | |
|---|---|---|
| WO | WO 1996/034357 A1 | 10/1996 |
| WO | WO 2001/061549 A2 | 8/2001 |

*Primary Examiner* — Ojo O Oyebisi
(74) *Attorney, Agent, or Firm* — Alston & Bird LLP

(57) ABSTRACT

The present disclosure is directed towards methods, systems and apparatuses for providing a human-machine interface and assistant that are particularly useful for financial trading and in researching trading opportunities in marketplaces that are otherwise difficult to research while taking into account a broad context of the query including past queries and specific preferences or restrictions of the user issuing the query. The present disclosure provides tools for interpreting voice queries and iteratively improving, through direct and inferred corrections, the translation and execution of queries for information and trading opportunities.

6 Claims, 4 Drawing Sheets

Related U.S. Application Data continuation of application No. 15/671,084, filed on Aug. 7, 2017, now Pat. No. 10,636,094.

(60) Provisional application No. 62/371,931, filed on Aug. 8, 2016.

(51) Int. Cl.
*G06Q 40/04* (2012.01)
*G10L 15/08* (2006.01)
*G10L 15/22* (2006.01)
*G10L 15/30* (2013.01)

(56) References Cited

U.S. PATENT DOCUMENTS

| | | |
|---|---|---|
| 6,751,597 B1 | 6/2004 | Brodsky et al. |
| 7,398,228 B2 | 7/2008 | Egashira et al. |
| 9,424,861 B2 * | 8/2016 | Jerram ............... G06Q 30/0203 |
| 2018/0040068 A1 | 2/2018 | Noonan |
| 2018/0308173 A1 | 10/2018 | Noonan |

* cited by examiner

| Instrument ID | Issuer | Term | Yield | Issue Date | Component of | ... |
|---|---|---|---|---|---|---|
| 1 | GE | 5yr | 2.4% | 1/1/15 | none | ... |
| 2 | UA | 10yr | 0.5% | 6/1/17 | ETF1 | ... |
| x | ... | ... | ... | ... | ... | ... |

METHODS, SYSTEMS AND APPARATUSES FOR PROVIDING A HUMAN-MACHINE INTERFACE AND ASSISTANT FOR FINANCIAL TRADING

CROSS REFERENCE TO RELATED APPLICATION

This application is a continuation of U.S. application Ser. No. 16/827,593, filed Mar. 23, 2020, which is a continuation of U.S. application Ser. No. 15/671,084, filed Aug. 7, 2017 and issued on Apr. 28, 2020 as U.S. Pat. No. 10,636,094, which claims the benefit of U.S. Provisional Application No. 62/371,931, filed Aug. 8, 2016, each of which are hereby incorporated by reference in their entireties.

RESERVATION OF RIGHTS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address computer software tools for interacting with and assisting traders of financial instruments to help them research and implement trades, and more particularly, include METHODS, SYSTEMS AND APPARATUSES FOR PROVIDING A HUMAN-MACHINE INTERFACE AND ASSISTANT FOR FINANCIAL TRADING.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

At present, it is estimated that a large portion of the trading of fixed income financial instruments such as bonds is accomplished by one trader speaking with another trader over the telephone or other voice or human-to-human platforms such as instant messaging. Although this human-based system has a long history, the benefits of electronic trading that are enjoyed in other financial industries are appealing, including increased efficiency and anonymity. Yet, there exist many challenges to the implementation of the types of electronic trading available in other financial industries to the trading of fixed income products.

For example, fixed income products are largely bespoke and there are a countless number of different products available, each with their own unique characteristics. Also, there are generally no central marketplaces where all products are listed for sale. Accordingly, unlike the equities market, in which a well-defined product such as a certain class of shares of a company are bought and sold with relatively transparent pricing on a central exchange, trading fixed income products very often requires human to human contact to first identify and describe the products available and then also to actually carry out a transaction. In addition, because there are not comprehensive, transparent clearinghouses of available products, liquidity in the fixed income marketplace can often be a problem, and can lead to undesirable product pricing.

Others have proposed responses to these issues. For example, some have proposed using computers to interpret voice commands related to trading instructions, however these attempts have not proven reliable and adaptable enough to the wide variety of fixed income products that traders expect to be able to trade.

BRIEF SUMMARY

The present inventions generally address methods, systems and apparatuses for providing a human-machine interface and assistant for financial trading.

In general, in one embodiment, a computer implemented method for providing a human-machine interface for financial trading, embodied as instructions stored in non-transitory computer memory which, when executed by a computer processor, are configured to input a voice query from a user, translate the query, execute the query on a database of information descriptive of financial instruments that was obtained from third party sources, return results of the query to the user, receive and store a correction from the user to at least one of the translation of the voice query and an aspect of the returned query results, re-execute the query, taking into account the correction, and return a result of the re-execution to the user together with an option to execute a trade in connection with a financial instrument described in the returned result of the re-execution.

In some implementations, the stored correction is taken into account during a subsequent execution of a subsequent voice query from the same user.

In some implementations, the stored correction is taken into account during a subsequent execution of a subsequent voice query from a different user who is affiliated with the user issuing the correction, but is not taken into account when executing a voice query received from a user that is not affiliated with the user issuing the correction.

In some implementations, the execution of the query includes referencing contents of a portfolio held by the user using the voice query.

In some implementations, the method further includes storing a record of whether the user took the option of executing the trade, wherein the record of whether the user took the option of executing the trade is referenced during a subsequent execution of a query from the same user.

In some implementations, the execution of the query includes referencing contents of a store of basic trading strategies presumed to be known by the user issuing the voice query.

BRIEF DESCRIPTION OF THE DRAWINGS

The accompanying drawings illustrate various non-limiting, example, innovative aspects in accordance with the present descriptions.

DETAILED DESCRIPTION

Figure 1:
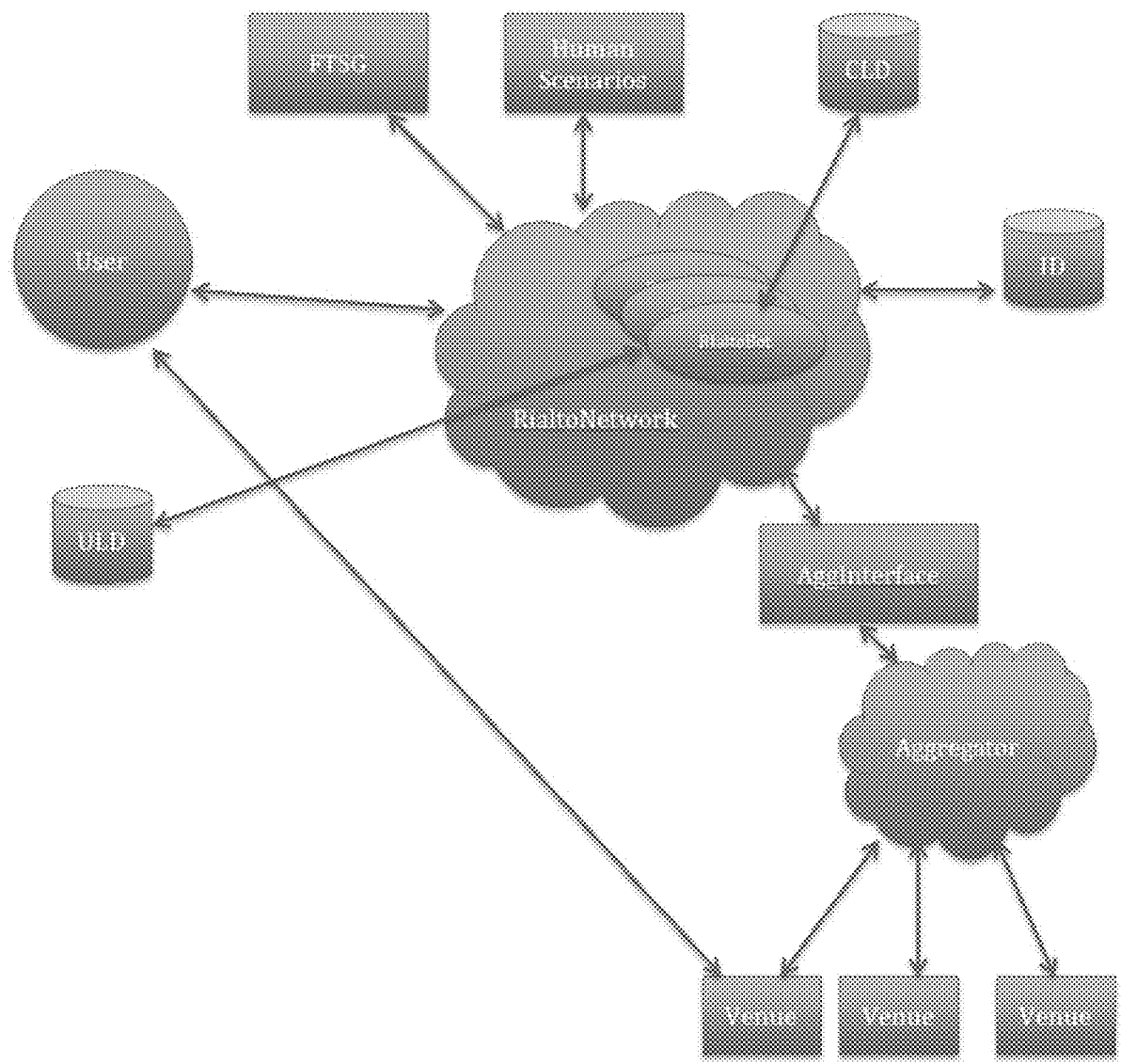
FIG. 1 shows a schema of exemplary components of the inventive system.

Embodiments of trading interfaces, methods, systems and apparatuses are described herein. While aspects of the described trading interfaces, methods, systems and apparatuses can be implemented in any number of different configurations, the embodiments are described in the context of the following exemplary configurations. The descriptions and details of well-known components and structures are omitted for simplicity of the description.

The description and figures merely illustrate exemplary embodiments of the inventive trading interfaces, methods, systems and apparatuses. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The present inventions may be considered to have several functions. For example, one function is to gather and maintain information about financial instruments that are available for trading. Another function is to negotiate and execute a trade. Still another function is to suggest trade opportunities. The functions of the present inventions may exist separately or may be integrated with one another. In some examples, when integrated, the functions can enjoy synergistic benefits beyond simply the addition of one function to another. For example, by observing a trader executing trades, the inventive system is able to learn the preferences and customs of a particular trader to suggest potential trades in the future or save the trader time by pre-configuring future trading instructions.

One concept that carries throughout the present inventions is that there is the possibility to allow a user to keep a private collection of information, history, learning, etc. that is proprietary to a trader or their employer. A parallel, generally available collection of this information may also be configured that is accessible to more than one trader or company. Accordingly, the inventive system is capable of acting and being used much like a loyal employee, rather than solely as a public service.

Information may enter the inventive system in many different ways and may likewise be stored in many different ways. In one example of storage, information may be stored in either a private or public database (or both). For simplicity, portions of the present description may refer to an information store in the singular tense, however the present inventions will be understood not to be limited to including only one information storage location or repository.

In one example, the inventive system may be configured to poll a data source for information about financial instruments available for trading. Such polling may be periodic, event driven, on demand, etc., or any combination. Accordingly, the input of information may occur synchronously or asynchronously with user requests or input. For example, polling may be configured to occur at a time interval that is a function of market and/or user activity. In another example information may be requested on a one time basis from a data source on a demand from a user, based on the occurrence of a preconfigured event, etc. In still another example, information may be pushed from a data store to the present information store. For example, if a bond issuer issues a new bond, the issuer may initiate their own information broadcast to the information store. In yet another example, a data source may periodically send information to the information store without first receiving request(s) for such information from the inventive system.

In another example, the inventive system may be configured with real-time links to information sources such as marketplaces such that information from those sources may not be stored in an information store of the present system apart from the whatever storage is in use by the marketplace.

Figures 3, 4:
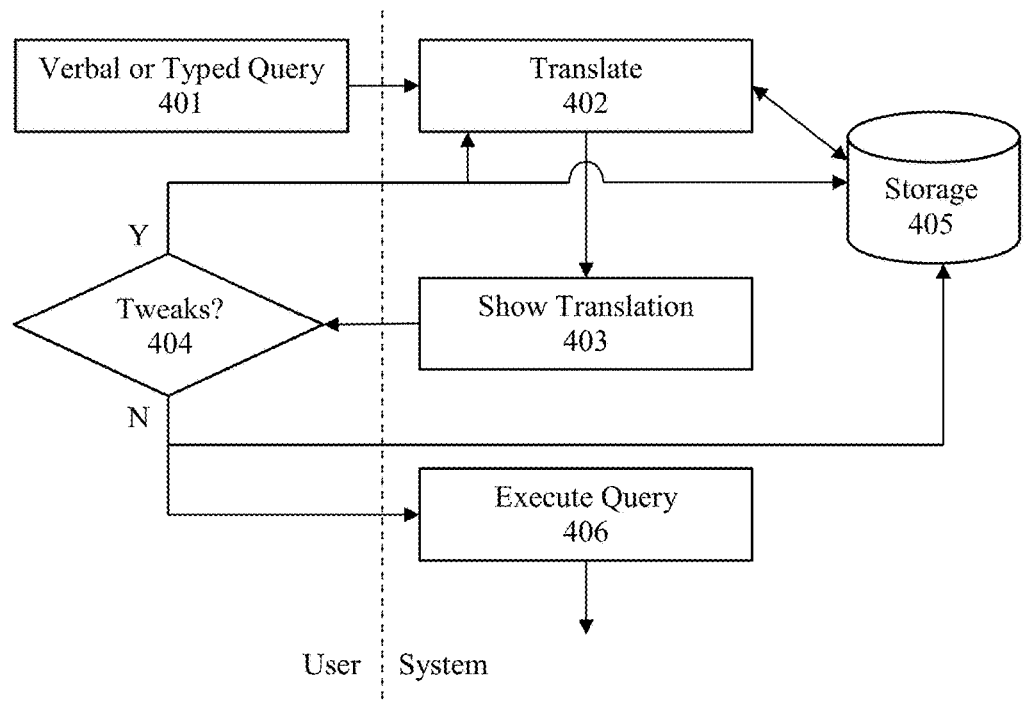
FIG. 3 partially illustrates an exemplary instrument database according to an exemplary embodiment.
FIG. 4 shows a block diagram of the translation and language correction aspect of an exemplary embodiment.

The information aggregated or accessed by the present system can take many forms and can describe many different aspects of a financial instrument. For example, information about a particular financial instrument (e.g., a corporate bond) may include price, yield, term, rating by a rating agency, whether the instrument is a component of some other instrument such as an exchange traded fund (ETF) etc. One example of an instrument database showing a record of such information is shown in FIG. 3. Other information may also be ingested by the system relevant to larger market dynamics that could affect more than one instrument. For example, external elements ingested by the system may include Federal Reserve interest rate changes or news, currency market information, major news stories, etc.

In another aspect, the present inventions may be configured to receive and act upon commands from traders. In one example, a speech recognition algorithm may be implemented to enable a trader to speak commands rather than type them. In this example, a trader is able to speak to the present system just as they would speak to a human counterparty or source of information.

For example, a trader could speak the request "find me a hundred K worth of B rated 10 year bonds from at least two different U.S. midcap healthcare companies" towards a voice input device such as a microphone connected to a computer programmed with the present inventive system. The trader's request would be parsed by a speech recognition component and then executed by an execution engine. The execution engine could be configured to search through an existing information store for the requested information before, at the same time as or after requesting matching information from outside data sources. The execution of a request may be on a one-time basis or may be configured to occur continuously or periodically. Finally, results of the request are presented to the trader by a display component. Optionally, the source of the results could also be displayed. The trader could then be given the option to execute any of the returned trading opportunities, by voice or other input means such as a mouse and/or keyboard.

In one example, shown generally in FIG. 4, the speech recognition and/or execution engine includes a language learning or correction component. Such a language learning component may be configured to improve function through supervised or reinforcement based learning. For example, after a trader's verbal or typed request or query is initially input 401, the speech recognition component may translate 402 the received audio or typing into words and/or trading jargon and cause the display component to display 403 the initial translation. The trader may then correct 404 any mis-translations verbally or through the use of other input means. Such corrections (or lack of corrections—taken as an approval of a translation) may be retained 405 and used as the basis for future translations. When the displayed translation is correct, the trader may then give the command to execute 406 the request. Alternatively, the results may be forwarded to another user or may be used by the trader as the basis for a further human to human communication with a counterparty or broker related to the results. Accordingly, to provide perspective, such a language learning tool may take the form of a language correction aspect 213 positioned between the user query 207 aspect and the execute query 208 aspect shown in the exemplary system of FIG. 2.

In another example of learning, even when a request is translated correctly, the results returned by the execution engine may not match what the trader was hoping to receive. This could be the fault of the execution engine missing a nuance of the request, or may also be the fault of the trader not specifying exactly what they were hoping to receive. No matter the cause of the fault, however, the inventive system may be configured to receive corrective instructions from the trader and may retain those corrections for use when executing future requests.

For example, when the execution engine is tasked with executing the above exemplary request relating to bonds issued by healthcare companies and returns results from two healthcare companies that have different names, but are actually owned by the same parent organization. Knowing this fact, the trader could verbally or otherwise instruct the system "company X and company Y are commonly owned, so please find me results from another company." The information that company X and company Y are commonly owned and are therefore not "different" as was requested in the trader's initial request may be retained in the information store and used to guide the execution of future requests for results from "different" or "commonly owned" companies.

As another example, a user may prefer the pricing or rating results from one agency or company over others and may correct the system as to their preference if the system does not use their preferred information source in returning results. Accordingly, for example if the system returns a price for a particular instrument according to one pricing source (e.g., IDC or ICE) but the user prefers to use BVAL. Going forward, the system may retain the preferred pricing and/or rating source for use in future information retrievals.

Learning corrections may be stored in a globally accessible manner or in a more restricted or personalized manner. For example, a correction such as "K means one thousand" may be retained and applied in all situations for all users of the inventive system. Conversely, a correction of "company X and company Y are commonly owned" may be retained in a partition of the information store and only accessible and usable by employees of the company whose trader issued the correction. As another example, a correction of "never show me results from company Z on Mondays" may only be applied to requests from the trader who issued the correction. Similarly, corrections or preferences may be retained on an instrument level. For example, a user may prefer to use the BVAL price for instrument X and may prefer to use the IDC price for instrument Y.

Similarly to how the system may infer a preference from follow up questions, the system may also be configured to infer the scope of a preference from an aggregation of user interactions. For example, if a particular user asks for the BVAL price of several different instruments on different occasions with little variation to other pricing tools, the system may be configured to infer a preference for that user of the BVAL price source. If other users in that user's organization also show a preference for the BVAL price, the system may infer an organization-wide preference for the BVAL price and use that preference in returning results going forward for all users at the organization unless it infers a different preference for isolated users within the organization.

In another example, learning may be carried out in a passive manner, as the result of monitoring a user's activity and preferences without receiving an affirmative correction from the user. For example, a learning component may sense that, of the five previous times that company Z has appeared in a result set, a particular user selected that company for the execution of a subsequent trade only once. Based on this preference (or non-preference), the learning component may influence the execution engine to rank company Z lower in a list of results or hide it in the future even if it otherwise matches parameters of a request.

In another example of passive or inferred learning, if a user asks for the price of a particular instrument, the system retrieves it according to ICE, for example, and the user asks a follow up question of "what is the BVAL price," in addition to returning the BVAL price, the system may retain the user's preference for BVAL prices for that instrument. It retains this preference even though the user did not indicate a preference for it or a disfavor of the ICE price, rather the system inferred the preference form the follow up question.

In yet another example, the system may perform a post-interaction analysis of all or a subset of all information present in the system relating to an interaction or instrument being interacted with to attempt to derive commonalities between a just-concluded interaction and previous interactions with a user. For example, after each interaction with a user (a buy-side trader, as an example), the system may be configured to analyze whether the user acted on the result (e.g., a suggestion of an instrument available for purchase) of the interaction favorably or unfavorably in connection with all information about that interaction known to the system (e.g., credit quality of the issuer, external market activity or news, liquidity of the instrument, the neighborhood of the instrument, etc.) in connection with similar post-interaction analyses performed at previous times with respect to previous interactions to derive preference information for the user, organization or instrument.

In another aspect, the inventive system may be configured to proactively search out trading opportunities without first receiving a specific request from a user to do so. For example, a user may perform several searches using the above described request-response interaction with the inventive system. After a number of such searches, the inventive system may be configured to infer a preference of the user for the type or source of information and opportunities that they search for and also end up executing as a result of their searches. Such inferences may be based on many different parameters, including those discussed above with respect to passive and inferred learning. For example, such parameters used to analyze and proactively suggest trading opportunities may include activity in related or unrelated financial markets, day of week, time of day, proximity to events such as holidays or earnings reports, how recently a user performed a search, the nature of a user's recent executed trades, the existing instruments held in a user's portfolio in comparison to overall portfolio goals or regulatory limits or parameters, etc.

In another example, the inventive system may be configured to examine a trader's existing portfolio to identify areas or possibilities for improvement and then go and search for matching available trading opportunities. For example, a trader may choose to input one or more parameters into the system specifying portfolio parameters that describe the boundaries within which their portfolio must exist (hard parameters) or more subjective goals (soft parameters) that the trader aims for their portfolio to meet. Examples of such parameters, any of which may be designated hard or soft parameters include, for example, interest rate risk of the portfolio or its components, regulatory compliance rules, credit risk, the aggregated credit rating profile of the portfolio components, credit rating boundaries for individual components, custodial limits, long vs. short preferences, issuer sectoral or industry preferences, etc.

In another aspect, the inventive system may be configured to respond or help respond to incoming requests for available trading opportunities. For example, if a user receives a request for information about all products available for purchase meeting a particular set of parameters, the inventive system may search for such opportunities within a user's portfolio (either flagged as being available or not) and present those options to a user who then selects which opportunities to communicate in response to the received request. In another example, the inventive system may execute a search outside of a user's own portfolio for opportunities to satisfy the received request, such as if the user is a broker of such trades or wishes to engage in arbitrage based on their superior knowledge or vision of available opportunities compared to the requesting party.

As discussed above with respect to searching for opportunities (e.g., on the "buy side") a learning component may be configured to enhance the performance of the inventive system when responding to requests (e.g., on the "sell side"). For example, if a user never identifies a particular holding as available for purchase from a set of results returned by the system, the learning component may cease to return that holding in response to future requests for information. As another example, if a user usually responds to a request from one particular user with a particular type of response, that type of response may be suggested in the future in response to future requests. For example, a sell-side trade may know that a particular buyer likes to buy products in batches of $10,000 and may respond to requests from that buyer with results batched that way. After sending such responses a number of times, the inventive system may retain such preference and in the future may suggest responses to that particular buyer batched the same way. In another example, the system may be configured to infer the tolerance, preference or limits of a user or organization for warehousing particular instruments or warehousing generally. Such preferences may be inferred or directly input into the system and may be based on any type of information held in the system. For example, the system may learn that an organization prefers to not warehouse more of a particular instrument than is traded in an average week for that instrument by that organization.

In another aspect, each user may be allocated an instance of the inventive system (e.g., their own "assistant") and those instances may be configured to communicate searches, responses and instructions back and forth without intervention or with minimal intervention or approval of their respective users. For example, one user's instance may automatically issue a request for available trades being offered by a second user. The second user's instance, having learned that the second user always responds to the first user with all available products to sell, returns a list of all of the trading opportunities that the second user is currently offering.

FIG. 1 shows an exemplary schema, which depicts the optional components: a Foundational Trading Scenario Generator (FTSG); human generated scenarios; user activity; a Central Learning Database (CLD); an online or offline User Learning Database (ULD); a hosting platform (RialtoNetwork) for the inventive system (Rialto Bot); an aggregator configured to send and receive information to and from information and trading venues; a normalized interface to the aggregator (AggInterface) for the system; and an Instrument Database (ID). In this example, the FTSG is supplied with basic trading strategies and knowledge generally known to users of the system. For example, this component represents the system's "book smarts" such as "buy low, sell high" and other basic strategies. The human generated scenarios are the active and passive learning opportunities described above that the system encounters as it is interacted with by the users. These scenarios may be generated in active use (with real money and portfolios) or may be generated in a "sandbox" of training scenarios not involving real trades, portfolios or money, but rather hypothetical scenarios based on real market and instrument data but generated without actually executing any trades. The CLD represents the database of learning results that are generated by the system, through its active or passive learning activities. The ULD is similar to the CLD in that it stores learning results, but in contrast the ULD stored learning results particular to a user or organization whereas the CLD stored learning results obtained and freely useable system-wide across users and organizations.

Figure 2:
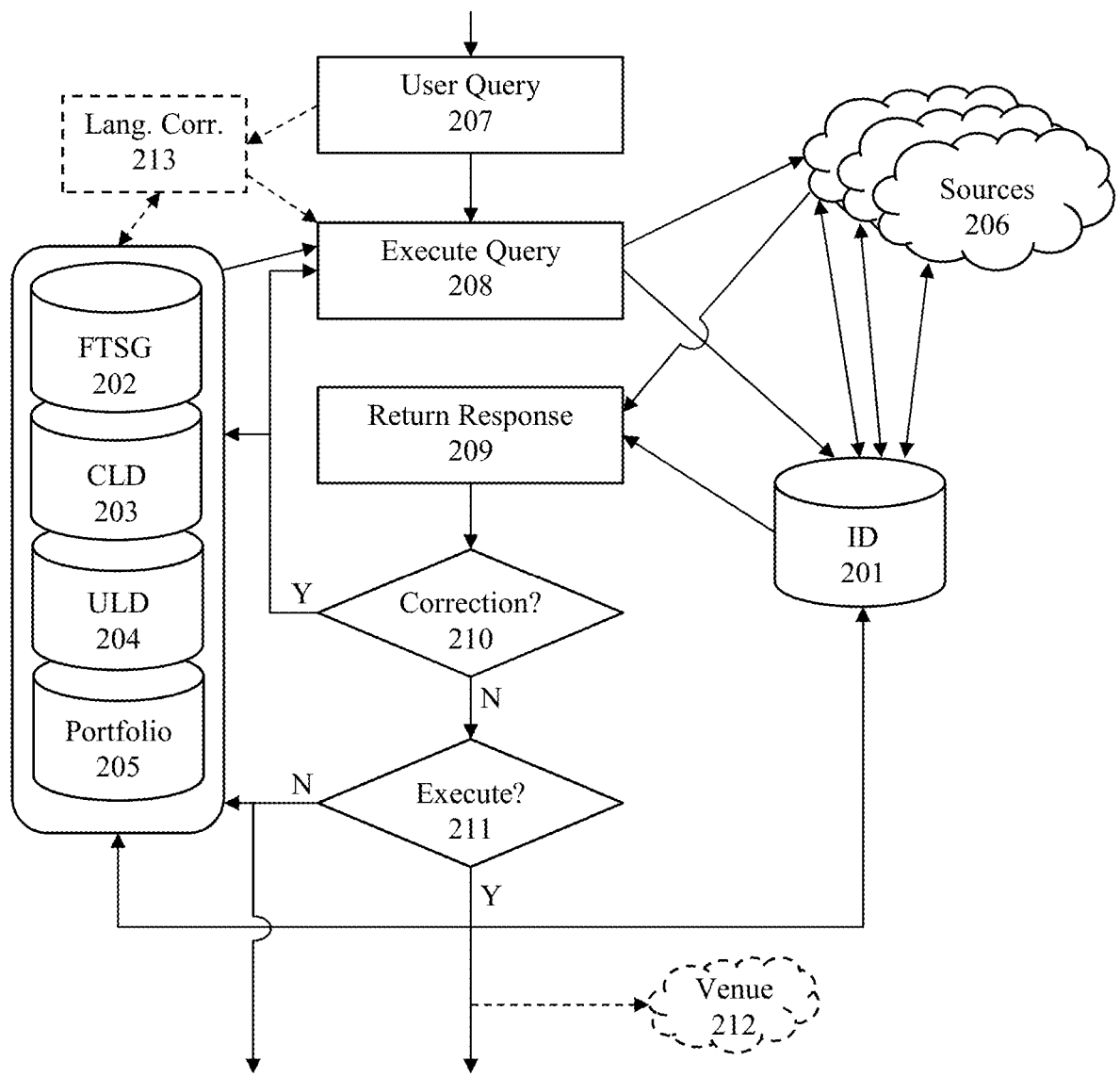
FIG. 2 shows a block diagram illustrating an exemplary embodiment of a Trading Assistant.

In another exemplary embodiment, shown by the process flow chart of FIG. 2, the system may be configured with an ID 201, FTSG 202, CLD 203, ULD 204 and a user's or an organization's existing portfolio information 205. The system may be configured to ingest information about instruments from various sources 206. Such ingestion may be configured to occur independently and asynchronously from user interactions, as a result of a user query, or a combination. The system may be configured to receive a user query 207 outlining one or more instruments of interest according to any descriptive attribute of such instruments, many of which are described above in more detail. Upon receipt of the query 207, the system may be configured to execute the query 208 by interpreting the query in light of the FTSG 202, CLD 203, ULD 204 and a user's or an organization's existing portfolio information 205 and then inspecting the ID 201 for matching or almost matching results. The results of the query may then be returned to the user 209. If a user issues a correction 210 after receiving the results, the system makes a note of the correction in the appropriate CLD 203 and/or ULD 204 and re-executes the query taking into account the correction. If no correction is issued, the user may then be permitted to execute a trade 210 on one or more of the returned results. If the user does not execute a suggested trade, that non-execution is recorded in the appropriate CLD 203 and/or ULD 204 and the system awaits the next user query. If the user enters an instruction to execute a trade, the system executes the trade (or issues an execution command to an third party trading venue 212), records the trade execution in the appropriate ID 201, CLD 203, ULD 204 and/or portfolio information 205 and awaits the next user query.

An Exemplary System i. Trading Assistant System Controller

Figure 5:
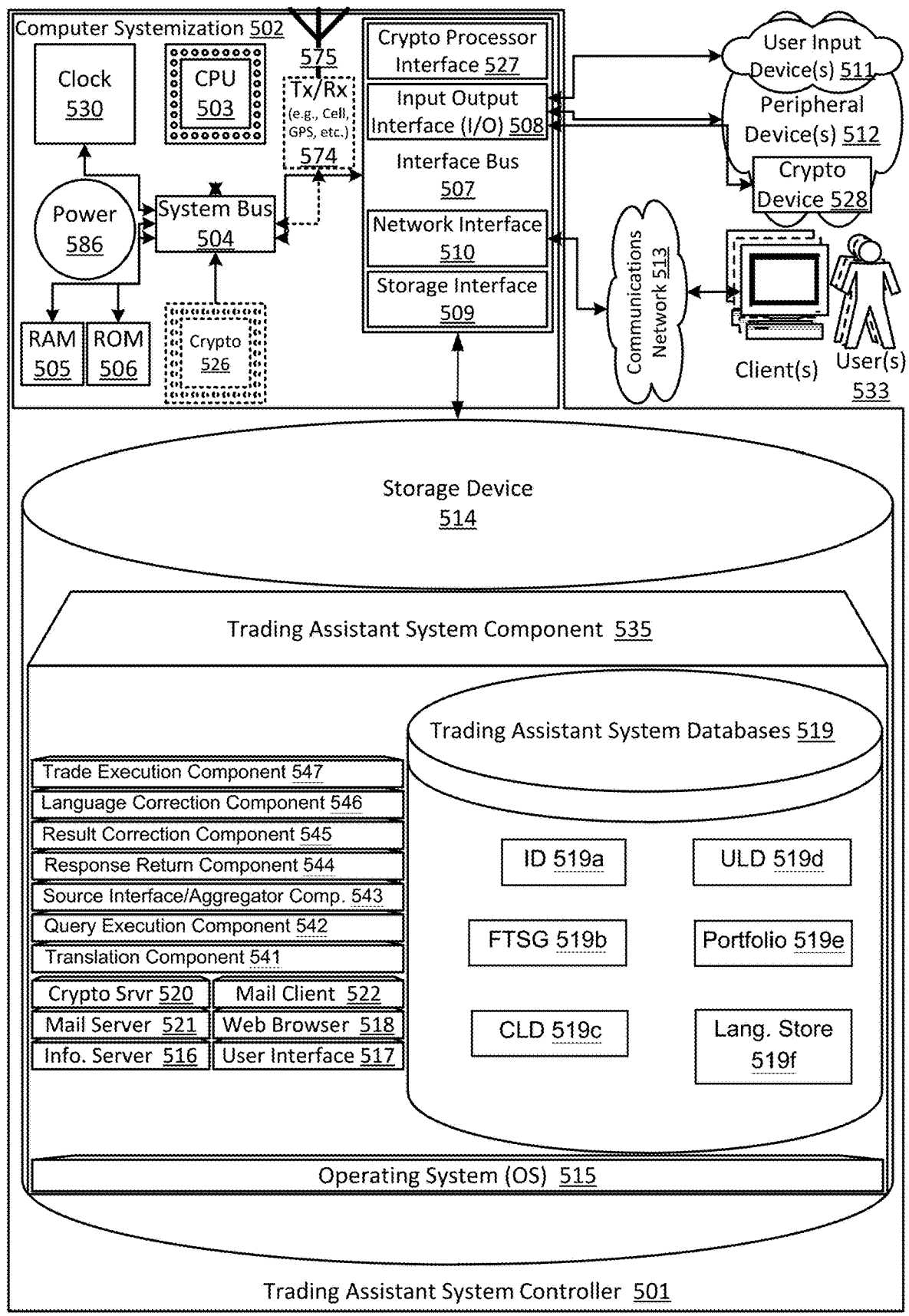
FIG. 5 shows a block diagram illustrating embodiments of a Trading Assistant System controller.

FIG. 5 shows a block diagram illustrating embodiments of a Trading Assistant System controller. In this embodiment, the Trading Assistant System controller 501 may serve to aggregate, process, store, search, serve, identify, instruct, generate, match, and/or facilitate interactions with a computer, and/or other related data.

Typically, users, which may be people and/or other computerized systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Trading Assistant System controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Trading Assistant System controller 501 may be based on computer systems that may comprise, but are not limited to, components such as: a computer systemization 502 connected to memory 529.

ii. Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Trading Assistant System controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Trading Assistant System controller and beyond through various interfaces. Should processing requirements dictate a greater amount speed and/or capacity, distributed processors (e.g., Distributed Trading Assistant System), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Trading Assistant System may be achieved by implementing a microcontroller such as CAST's R8051XC2 microcontroller; Intel's MCS 51 (i.e., 8051 microcontroller); and/or the like. Also, to implement certain features of the Trading Assistant System, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Trading Assistant System component collection (distributed or otherwise) and/or features may be implemented via the microprocessor and/or via embedded components; e.g., via ASIC, coprocessor, DSP, FPGA, and/or the like. Alternately, some implementations of the Trading Assistant System may be implemented with embedded components that are configured and used to achieve a variety of features or signal processing.

Depending on the particular implementation, the embedded components may include software solutions, hardware solutions, and/or some combination of both hardware/software solutions. For example, Trading Assistant System features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Trading Assistant System features. A hierarchy of programmable interconnects allow logic blocks to be interconnected as needed by the Trading Assistant System designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Trading Assistant System may be developed on regular FPGAs and then migrated into a fixed version that more resembles ASIC implementations. Alternate or coordinating implementations may migrate Trading Assistant System controller features to a final ASIC instead of or in addition to FPGAs. Depending on the implementation all of the aforementioned embedded components and microprocessors may be considered the "CPU" and/or "processor" for the Trading Assistant System.

iii. Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Trading Assistant System thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

iv. Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Trading Assistant System controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Trading Assistant System), architectures may similarly be employed to pool, load balance, and/or otherwise increase the communicative bandwidth required by the Trading Assistant System controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Trading Assistant System controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Trading Assistant System controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Trading Assistant System controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

v. Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Trading Assistant System controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

vi. Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the Trading Assistant System component(s) 535; the Translation component 541; the Query Execution component 542, the Source Interface or Aggregator component 543; the Response Return component 544; the Result Correction component 545; the Language Correction component 546; the Trade Execution component 547 and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

vii. Operating System

The operating system component 515 is an executable program component facilitating the operation of the Trading Assistant System controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 10/8/7/2003/2000/98/95/3.1/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Trading Assistant System controller to communicate with other entities through a communications network 513. Various communication protocols may be used by the Trading Assistant System controller as a subcarrier transport mechanism for interaction, such as, but not limited to: multicast, TCP/IP, UDP, unicast, and/or the like.

viii. Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Trading Assistant System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Trading Assistant System databases 519, operating systems, other program components, user interfaces, Web browsers, and/or the like.

Access to the Trading Assistant System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Trading Assistant System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Trading Assistant System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

ix. User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

x. Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Trading Assistant System enabled nodes. The combined application may be nugatory on systems employing standard Web browsers.

xi. Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Trading Assistant System. Mail may also take the form of messages sent from one Trading Assistant System user to another that is not in the form of traditional email but is more akin to direct messaging or the like conventionally enabled by social networks.

Access to the Trading Assistant System mail may be achieved through a number of APIs offered by the individual Web server components and/or the operating system.

Also, a mail server may contain, communicate, generate, obtain, and/or provide program component, system, user, and/or data communications, requests, information, and/or responses.

xii. Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

xiii. Cryptographic Server

A cryptographic server component 520 is a stored program component that is executed by a CPU 503, cryptographic component 526, cryptographic processor interface 527, cryptographic processor device 528, and/or the like.

Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RCS), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Trading Assistant System may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Trading Assistant System component to engage in secure transactions if so desired. The cryptographic component facilitates the secure accessing of resources on the Trading Assistant System and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

xiv. The Trading Assistant System Databases

The Trading Assistant System databases component 519 may be embodied in one database and its stored data, may be embodied in two or more distinct databases and their stored data, or may be partially or wholly embodied in an unstructured manner. For the purposes of simplicity of description, discussion of the Trading Assistant System databases component 519 herein may refer to such component in the singular tense, however this is not to be considered as limiting the Trading Assistant System databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Trading Assistant System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Trading Assistant System database is implemented as a data-structure, the use of the Trading Assistant System database 519 may be integrated into another component such as the Trading Assistant System component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519*a-f*, examples of which are described above. For example, the database component may include an ID 519*a*, FTSG 519*b*, CLD 519*c*, ULD 519*d*, a Portfolio database 519*e* and a Language translation store 519*f*.

In one embodiment, the Trading Assistant System database 519 may interact with other database systems. For example, employing a distributed database system, queries and data access by a search Trading Assistant System component may treat the combination of the Trading Assistant System databases 519, an integrated data security layer database as a single database entity.

In one embodiment, user programs may contain various user interface primitives, which may serve to update the Trading Assistant System. Also, various accounts may require custom database tables depending upon the environments and the types of clients the Trading Assistant System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-f*. The Trading Assistant System may be configured to keep track of various settings, inputs, and parameters via database controllers.

The Trading Assistant System database may communicate to and/or with other components in a component collection, including itself, and/or facilities of the like. Most frequently, the Trading Assistant System database communicates with the Trading Assistant System component, other program components, and/or the like. The database may contain, retain, and provide information regarding other nodes and data.

xv. The Trading Assistant Systems

The Trading Assistant System component 535 is a stored program component that is executed by a CPU. In one embodiment, the Trading Assistant System component incorporates any and/or all combinations of the aspects of the Trading Assistant System that was discussed in the previous figures. As such, the Trading Assistant System affects accessing, obtaining and the provision of information, services, transactions, and/or the like across various communications networks. The features and embodiments of the Trading Assistant System discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the Trading Assistant System's features and facilities, and in many cases reduce the costs, energy consumption/requirements, and extend the life of Trading Assistant System's underlying infrastructure; this has the added benefit of making the Trading Assistant System more reliable. Similarly, many of the features and mechanisms are designed to be easier for users to use and access, thereby broadening the audience that may enjoy/ employ and exploit the feature sets of the Trading Assistant System; such ease of use also helps to increase the reliability of the Trading Assistant System. In addition, the feature sets include heightened security as noted via the Cryptographic components 520, 526, 528 and throughout, making access to the features and data more reliable and secure.

The Trading Assistant System component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Trading Assistant System server employs a cryptographic server to encrypt and decrypt communications. The Trading Assistant System component may communicate to and/or with other components in a component collection, including itself, and/or facilities of the like. Most frequently, the Trading Assistant System component communicates with the Trading Assistant System database, operating systems, other program components, and/or the like. The Trading Assistant System may contain, communicate, generate, obtain, and/or provide program component, system, user, and/or data communications, requests, and/or responses.

xvi. Distributed Trading Assistant Systems

The structure and/or operation of any of the Trading Assistant System node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Trading Assistant System controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Trading Assistant System controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
 .IBMDI.doc/referenceguide295.htm and other parser implementations:

http://publib.boulder.ibm.com/infocenter/tivihelp/v2r1/index.jsp?topic=/com.ibm
 .IBMDI.doc/referenceguide259.htm all of which are hereby expressly incorporated by reference.

CONCLUSION

FIGS. 1 through 5 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for METHODS, SYSTEMS AND APPARATUSES FOR PROVIDING A HUMAN-MACHINE INTERFACE AND ASSISTANT FOR FINANCIAL TRADING (including the Cover Page, Title, Headings, Cross-Reference to Related Application, Background, Brief Summary, Brief Description of the Drawings, Detailed Description, Claims, Figures, Abstract and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. For example, aspects may be adapted for video, audio or any other content. While various embodiments and discussions have included reference to applications in the legal industry, it is to be understood that the embodiments described herein may be readily configured and/or customized for a wide variety of other applications and/or implementations.

What is claimed is:

1. A computer implemented method for providing a human-machine interface for financial trading, embodied as instructions stored in non-transitory computer memory which, when executed by a computer processor, are configured to:

input a voice query from a user;
translate the query;
execute the query on a database of information descriptive of financial instruments that was obtained from third party sources;
return results of the query to the user;
receive and store a correction from the user to at least one of the translation of the voice query and an aspect of the returned query results;
re-execute the query, taking into account the correction; and
return a result of the re-execution to the user together with an option to execute a trade in connection with a financial instrument described in the returned result of the re-execution.

2. The method of claim 1, wherein the stored correction is taken into account during a subsequent execution of a subsequent voice query from the same user.

3. The method of claim 1, wherein the stored correction is taken into account during a subsequent execution of a subsequent voice query from a different user who is affiliated with the user issuing the correction, but is not taken into account when executing a voice query received from a user that is not affiliated with the user issuing the correction.

4. The method of claim 1, wherein the execution of the query includes referencing contents of a portfolio held by the user using the voice query.

5. The method of claim 1, further comprising:

storing a record of whether the user took the option of executing the trade, wherein the record of whether the user took the option of executing the trade is referenced during a subsequent execution of a query from the same user.

6. The method of claim 1, wherein the execution of the query includes referencing contents of a store of basic trading strategies presumed to be known by the user issuing the voice query.

\* \* \* \* \*